(No Model.)

D. J. HILL.
PLOW.

No. 469,435. Patented Feb. 23, 1892.

Witnesses:
E. S. Duvall Jr.
W. S. Duvall

Inventor
David J. Hill.
By his Attorneys,
C. A. Snow & Co.

UNITED STATES PATENT OFFICE.

DAVID JEFERSON HILL, OF LAMPASAS, TEXAS.

PLOW.

SPECIFICATION forming part of Letters Patent No. 469,435, dated February 23, 1892.

Application filed September 11, 1891. Serial No. 405,423. (No model.)

*To all whom it may concern:*

Be it known that I, DAVID JEFERSON HILL, a citizen of the United States, residing at Lampasas, in the county of Lampasas and State of Texas, have invented a new and useful Plow, of which the following is a specification.

This invention relates to an improvement in that class of plows commonly known as "sweeps;" and the objects of my invention are to provide a device of cheap and simple construction adapted to be applied to the rear or upper edge of an ordinary sweep and to be adapted to separate the clods of earth turned by the sweep and return the same to a point in rear of the point thereof, thereby leaving a broken but level furrow or path in which all weeds and grass are turned under.

Other objects and advantages of the invention will appear in the following description, and the novel features thereof will be particularly pointed out in the claim.

Figure 1:
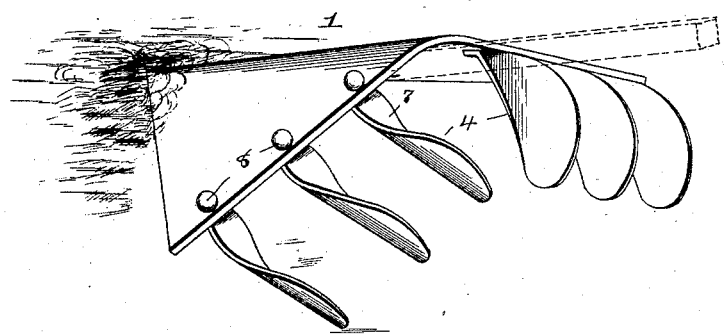
Figure 2:
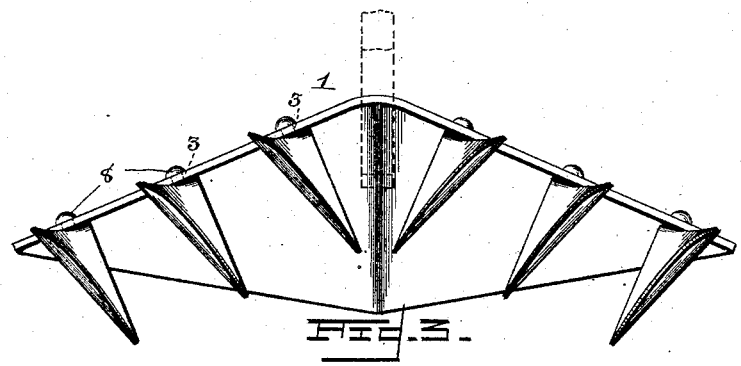
Figure 3:
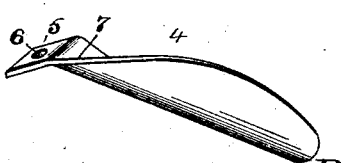

Referring to the drawings, Figure 1 is a perspective of a sweep-plow provided with an attachment constructed in accordance with my invention. Fig. 2 is a rear view thereof. Fig. 3 is a perspective in detail of one of the blades.

Like numerals indicate like parts in all the figures of the drawings.

1 designates an ordinary double sweep, though, if desired, an attachment may be as readily applied to and will serve the same functions in connection with a single sweep. The sweep, as is usual, is of triangular shape and terminates at its front end in a point. Along its upper or rear edge the sweep is provided at each side of its center with a series of perforations or bolt-openings 3, which may be of any number desired, in accordance with the number of blades, hereinafter described, that are used.

4 designates a deflecting-blade, which is of substantially oval shape, as shown, and at its front end merges into a reduced shank or tang 5, having a bolt-receiving opening 6. Immediately in rear of their shanks or tangs the blades are given about a quarter-twist, as indicated at 7.

The blades are secured to the upper rear edge of the plow by means of bolts 8, passed through the perforations of the shanks and those of the plow, and it will be observed that the blades tend inwardly—that is, the blades at one side of the center of the plow are disposed in one direction, while those at the opposite side are oppositely disposed.

In operation the plow moves along in the usual manner, turning the dirt up over the back edge of the same until it is caught by the curved or deflected blades, all of which tend toward the center of the plow, whereby it is guided directly under and in rear of said center, where it is deposited. In this manner the furrow formed by the plow is covered or closed, and instead of leaving a deep hard groove to indicate the travel of the plow, which groove is liable to crack and fissure, a level covered furrow is left, and all weeds, grass, and other vegetation are turned under.

From the foregoing description, taken in connection with the accompanying drawings, it will be seen that I provide for a long-felt want, in that I avoid the annoyance experienced by all farmers in tilling their land by reason of the formation of their sweeps of hard grooves or furrows, which become baked by the sun and are seamed by deep undesirable cracks or fissures.

Having described my invention, what I claim is—

The herein-described improved pulverizer, the same consisting of the plow and the series of pulverizing-blades secured to the rear oppositely-inclined edges of the plow, the blades at each side of the center of the plow being inwardly disposed and each blade consisting of an oval body curved transversely throughout its length, and a shank at the inner half of the front end, substantially as specified.

In testimony that I claim the foregoing as my own I have hereto affixed my signature in the presence of two witnesses.

DAVID JEFERSON HILL.

Witnesses:
W. C. McDOYLE,
S. V. HICKMAN.